United States Patent [19]

Hooper

[11] Patent Number: 5,082,586
[45] Date of Patent: Jan. 21, 1992

[54] $SO_x/NO_x$ POLLUTION CONTROL COMPOSITION

[75] Inventor: Richard G. Hooper, Littleton, Colo.

[73] Assignee: NaTec Resources, Inc., Houston, Tex.

[21] Appl. No.: 268,165

[22] Filed: Nov. 7, 1988

Related U.S. Application Data

[62] Division of Ser. No. 170,719, Mar. 21, 1988, Pat. No. 4,844,915.

[51] Int. Cl.⁵ .............................................. B01D 53/00
[52] U.S. Cl. ...................................... 252/184; 423/239
[58] Field of Search ......................... 252/184; 423/239

[56] References Cited

U.S. PATENT DOCUMENTS

| | | | |
|---|---|---|---|
| 3,565,575 | 2/1971 | Warshaw | 423/235 |
| 3,880,629 | 4/1975 | Dulin et al. | 423/244 |
| 3,984,312 | 10/1976 | Dulin et al. | 210/15 |
| 4,034,063 | 7/1977 | Rosar et al. | 423/244 |
| 4,208,386 | 6/1980 | Arand et al. | 423/235 |
| 4,325,713 | 4/1982 | Rosenberg et al. | 55/73 |
| 4,325,924 | 4/1982 | Arand et al. | 423/234 |
| 4,620,856 | 11/1986 | Rosenberg et al. | 55/73 |
| 4,767,605 | 8/1988 | Lindbauer et al. | 423/235 |

FOREIGN PATENT DOCUMENTS 56-105731  8/1981  Japan .................. 423/244

OTHER PUBLICATIONS $NO_x$ Removal as a By-Product of $SO_2$ Control, EPRI Journal, Nov. 1986, p. 44.
Maulbetsch, J. Offen, G., Sodium Sorbent Removal of $NO_x$, EPRI Journal Oct./Nov. 1987, pp. 54-56.
Technology—*Method Uses Urea to Rid Flue Gas of $NO_x$*, Chemical and Engineering News, p. 22, Apr. 18, 1988 news report by Dermot O'Sullivan, London.
Urea, Kirk–Othmer Encyclopedia of Chemical Technology, vol. 23, pp. 548–553, John Wiley & Sons (1983).
Chemical Abstracts, vol. 101, Abstract No. 179 982a, Alekhin et al, "Electrolyte for Producing Sodium Perborate", Aug. 1984.

Primary Examiner—Robert L. Stoll
Assistant Examiner—Valerie Fee
Attorney, Agent, or Firm—The Dulin Law Firm

[57] ABSTRACT $SO_x/NO_x$ pollution control reagent composition comprising from 0.1 to 25% urea in intimate admixture with dry, finely divided Nahcolite, a naturally occurring form of sodium bicarbonate. The composition is used in a process of removing $SO_x/NO_x$ from the flue gases of utility and industrial plants, incinerators and the like by dry injection into a flue gas duct a sufficient distance upstream of a spent reagent collection device to provide above about 0.25 seconds of residence time of the reagent composition in the flue gas duct at temperatures in the range of above about 200° F. followed by collection, preferably in an electrostatic precipitator. The Nahcolite reacts with the $SO_2$ to form sodium sulfate and also removes $NO_x$ in the form of NO. The urea prevents the conversion of NO to $NO_2$ by the Nahcolite, and maintains the concentration of the $NO_2$ in the exit flu gases below the 50 parts per million visibility threshold (depending on ambient conditions). The use of urea in the composition improves the $SO_x$ removal efficiency and utilization of the Nahcolite to near theoretical. The reagent composition and process can be employed in a wide variety of pollution control processes employing various types of standard sorbent contact equipment such as ESPs, baghouses, spray dryers, fluid beds, cyclones, scrubbers and co-current/counter current reactors.

15 Claims, 3 Drawing Sheets

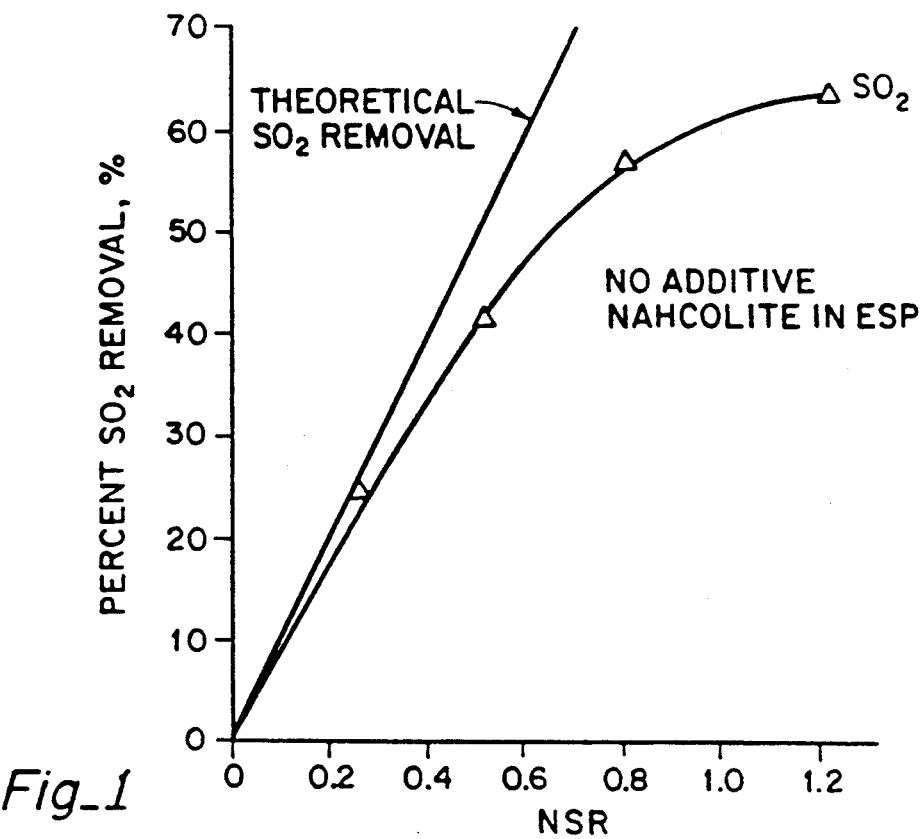
Fig_1
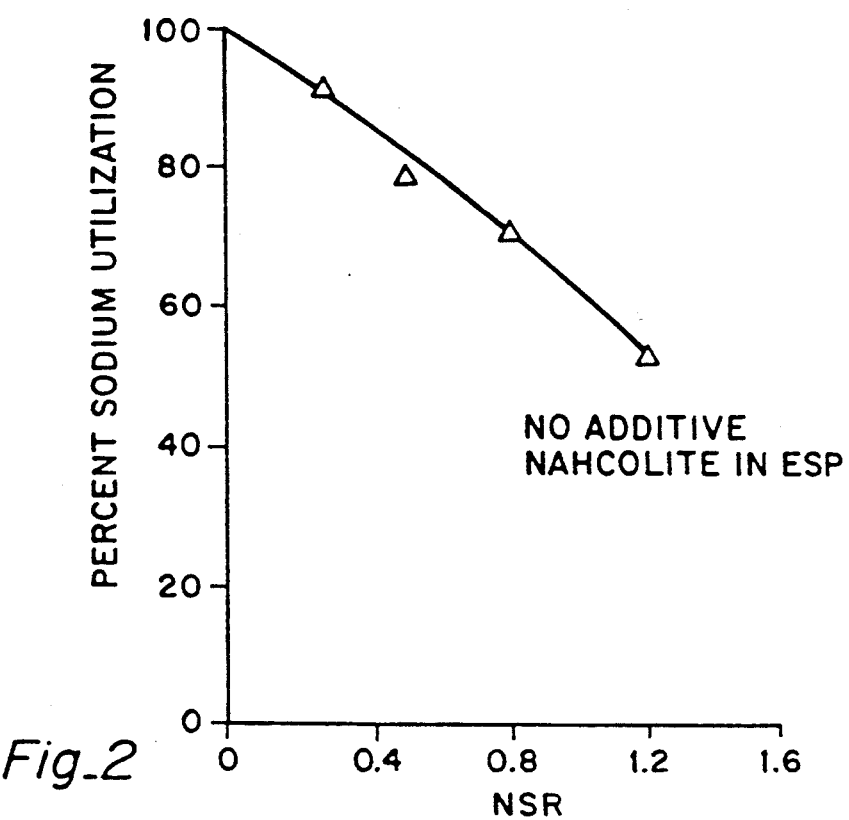
Fig_2

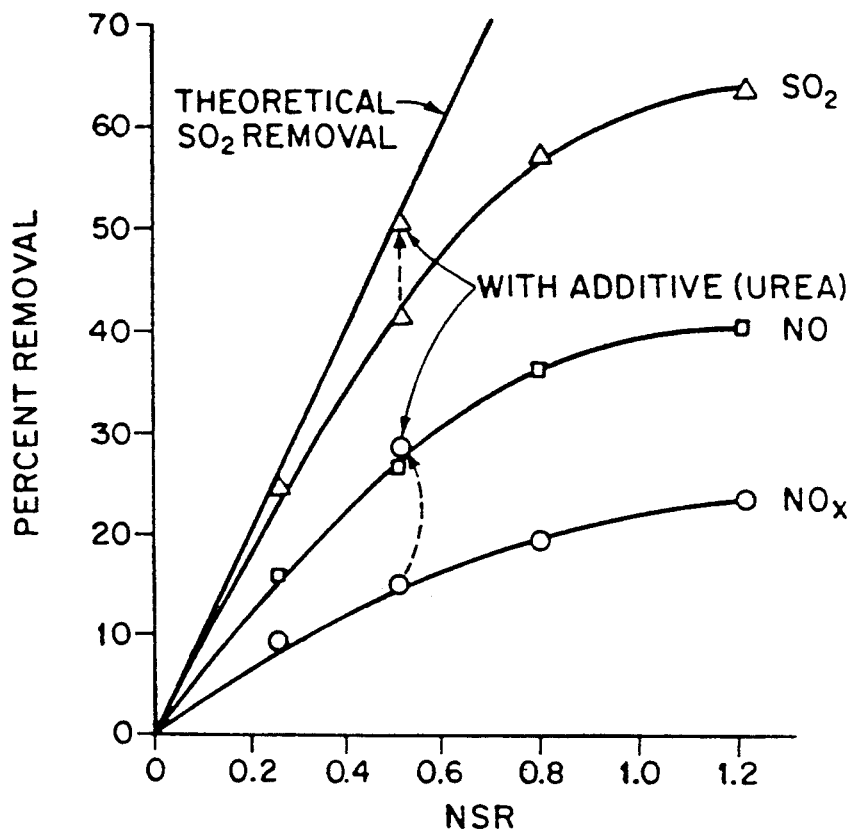
Fig_5

$SO_x$ $NO_x$ POLLUTION CONTROL COMPOSITION

This is a divisional, pursuant to a traversed U.S. PTO restriction requirement, of application Ser. No. 170,719, filed Mar. 21, 1988, by Applicant, now U.S. Pat. No. 4,844,915 issued July 4, 1989.

FIELD

The invention relates to a $SO_x/NO_x$ pollution control reagent composition and method for control of brown plume coloration associated with the injection of sodium reagents into the inlet ductwork to remove $SO_2$ from the flue gases of industrial and utility plants that fire (burn) fossil fuels or wastes to generate electricity, steam or heat. More particularly, the method of the invention employs a novel composition of sodium bicarbonate (preferably nahcolite) plus urea to suppress the formation of $NO_2$ causing plume coloration in exit flue gases as a result of removal of $SO_2$ from the flue gases.

BACKGROUND

The increasing use of sulfur-containing fuels as energy sources, namely coal and oil, has resulted in pollution of the atmosphere throughout the world. The burning of the fuel produces flue gases containing substantial quantities of $SO_x$, predominantly $SO_2$ and $SO_3$.

A wide variety of processes have been proposed for the removal of the $SO_2$ from flue gases before they are emitted to the atmosphere. Processes using dry solids, liquids or slurries of sorbents injected in a manner to directly contact the flue gases have proven to be effective for control of $SO_2$ emissions. Of these, the calcium-based wet scrubber systems have experienced the greatest use in industrial and utility application. This involves finely grinding lime or limestone of suitable composition, forming a water slurry or mixture, and providing apparatus and method for slurry contact with the flue gases. The $SO_2$ reacts with the calcium reagent to form calcium sulfate/sulfite which is collected and removed in the form of a generally thixotropic sludge. This sludge is usually difficult to dispose because it does not easily dewater, and heavy metals can leach from the waste sludge containment ponds.

Further, abrasion to the slurry pumps and other scrubber handling equipment (due to the hardness of the limestone particles) increases maintenance costs. The operating costs are increased because the evaporation of water in the system cools the flue gases nominally by 200° F. The moist flue gases, containing as they do some residual dissolved $SO_x$, are also acidic. In addition, where the utility or industrial plant is located in an arid region, the water requirements of a wet pollution control process are expensive and drain an already scarce natural resource.

The subject of flue gas desulfurization by the injection of dry sodium-based reagents has been extensively investigated in laboratory, pilot, and full scale applications since the 1960's. These investigations have provided the technical basis to evaluate the economic aspects of the technology and compare its advantage to the current calcium-based technologies. The injection of dry reagents clearly is the least demanding of capital funds for both new and retrofit applications. The use of familiar hardware such as pulverizers, blowers, and silos permit the easy installation and operation of this simple technology.

Accordingly, the injection of dry reagents into flue gases have become of increasing interest. Principal among these is the use of sodium compounds as a reagent or sorbent. Sodium-based reagents that have been used are commercial sodium bicarbonate ($NaHCO_3$), light and dense soda ash ($Na_2CO_3$), sodium sesquicarbonate ($Na_2CO_3.NaHCO_3.2H_2O$), trona (a naturally occurring form of sodium sesquicarbonate), and Nahcolite (a naturally occurring form, of sodium bicarbonate). The reagents of greatest effectiveness are commercial sodium bicarbonate and Nahcolite. The sodium bicarbonate or Nahcolite is injected into the flue gas duct of a utility or industrial plant, and reacts with $SO_2$ in the gas stream to produce $Na_2SO_4$ which is collected in a baghouse or on plates of an ESP.

However, I have observed that the use of sodium can result in production of a reddish-brown plume coloration in stack gases downstream of the particulate control device. The use of the sodium bicarbonate not only removes $SO_2$, but also removes some $NO_x$ (NO and $NO_2$). While the precise mechanism is not known at this time, it is presently thought that some step within the overall sulfation reaction (reaction of sodium reagent with $SO_x$) initiates the oxidation of NO to $NO_2$. It is the presence of the $NO_2$ in the exiting flue gases which is the source of the plume coloration.

Accordingly, this promising sodium reagent $SO_x$ control process has a serious disadvantage, in that its use creates an $NO_2$ plume in the process of its removal of $SO_x$ pollution from flue gases. Accordingly, there is a great need for a method by which the $NO_2$ produced by the use of sodium reagents can also be removed or suppressed, while not sacrificing $SO_x$ removal. Nearly all previous investigations have linked the injection of sodium based reagents with the use of a fabric filter for particulate control. However, as this invention shows, the injection of dry sodium reagents is also effective even when an electrostatic precipitator (ESP) is used for particulate and $SO_x/NO_x$ control.

THE INVENTION

Objects

It is among the objects of this invention to provide a method for removal or suppression of $NO_2$ formation during the use of dry sodium reagents, particularly sodium carbonate/bicarbonate compounds injected into flue gases of utility and industrial plants for removal of $SO_x$.

It is another object of this invention to provide a novel sorbent composition for introduction into the flue gases of such plants for suppression of formation of $NO_2$ while simultaneously removing $SO_x$.

It is another object of this invention to provide a method of $NO_2$ removal or suppression by introduction of urea in solution or powdered form in combination with a sodium reagent into the flue gas of such plants ahead of a collector device, particularly an ESP.

It is another object of this invention to improve the $SO_x$ removal efficiency and the utilization of sodium-based reagents, particularly sodium bicarbonate/Nahcolite, while at the same time removing $NO_x$ and suppressing $NO_2$ emissions to the atmosphere.

Still other objects of this invention will be evident from the Summary, Drawings, Detailed Description, Abstract and claims of this case.

SUMMARY

The method of this invention comprises the introduction of a novel $SO_x/NO_x$ reagent composition, preferably in a finely divided dry form (but also in solution or slurry form), into the flue gas of a utility or industrial plant in the range of from about 0.1 to 1.5 the Normalized Stoichiometric Ratio of the $SO_x$ to be removed. The novel $SO_x/NO_x$ reagent composition of this invention comprises a dry finely divided mixture of a sodium reagent, preferably sodium bicarbonate, or Nahcolite (either or both herein termed "bicarb"), with urea in the range of from about 0.1 to 25% by weight urea in the total composition, preferably about 5 to 15%. This bicarb/urea composition is preferably finely ground uniform admixture of urea in bicarb, or a uniform admixture of unground urea and finely ground bicarb which is injected evenly throughout the gas stream ahead of the ESP. The reaction products collected by the ESP can be disposed in the same manner as sodium reagents used without the use of urea.

Surprisingly, I have discovered that sodium reagents (preferably bicarb) not only remove $SO_2$ but also remove some $NO_x$ (NO and $NO_2$) in direct proportion to the amount of $SO_2$ removed. The ratio of $NO_x/SO_x$ removed ranges from about 1:6 to 1:3 with 1:4.5 about average.

In the process, there is some conversion of nitrogen oxide (NO) to nitrogen dioxide ($NO_2$). Some, but not all of the $NO_2$ reacts with the carbonates and/or sulfates produced by the injection of the reagent. The remaining unreacted $NO_2$ exits the particulate collection device and is responsible for producing a reddish-brown plume coloration. Surprisingly, the addition of urea to the reagent reduces or eliminates the unreacted $NO_2$ from the exit gas stream and thereby prevents the unwanted plume coloration.

I have also discovered, quite unexpectedly, that not only does urea reduce $NO_2$ in the exit gas steam, but also the efficiency of removal of $SO_x$ by the sodium reagent increases by the use of urea. The percent utilization of bicarb can be increased by 10% or more, and on the average the increase is 25%. Conversely, to remove a given percentage of $SO_x$, the Normalized Stoichiometric Ratio (NSR) can be reduced to near theoretical, while the $NO_2$ removal is increased some 50%. Thus, for example, for 65% $SO_x$ removal, the NSR drops from 1.2 to about 0.7 while $NO_2$ removal increases from 16% to 32% without exceeding the visible plume threshold.

I believe that the reagent (sorbent) composition of this invention could be applied to a wide variety of dry, wet or slurry $SO_x/NO_x$ pollution control processes employing various types of injection and collection techniques, such as ESPs, baghouses, spray dryers, cyclones, fluidized bed injection or collection systems, scrubbers, counter-current or co-current contactors and the like. I also expect the reagent composition of this invention to give equivalent results using any of those devices to treat a wide range of flue gases types, compositions and conditions, e.g., incinerators, paper plants, boilers, furnaces, coke ovens, refineries, smelters, steam plants, utilities and all variety of industrial plants.

While I prefer the dry powdered urea to be introduced simultaneously with the sodium reagent as a substantially uniform mixture, it can be separately introduced into the flue gas stream at or near the location of the sodium-based reagent. For example, a solution of urea in water can be sprayed into the flue gases ahead of, coordinate with (in staggered array), or just downstream of the dry sodium reagent injection point. The urea solution may be sprayed onto the bicarb crystals and let dry, or the thus-coated bicarb crystals can be injected damp into the flue gases.

DRAWINGS

The invention is further described in connection with the drawings in which:

FIG. 1 is a graph showing percent $SO_2$ removal vs NSR for sodium bicarbonate, with the straight line being theoretical for the reaction with $SO_2$ and the curve being actual results from injection of sodium bicarbonate ahead of an ESP.

FIG. 2 is a graph of average reagent utilization vs NSR based on actual results of the tests shown in FIG. 1 (sodium bicarbonate in an ESP).

Figure 4:
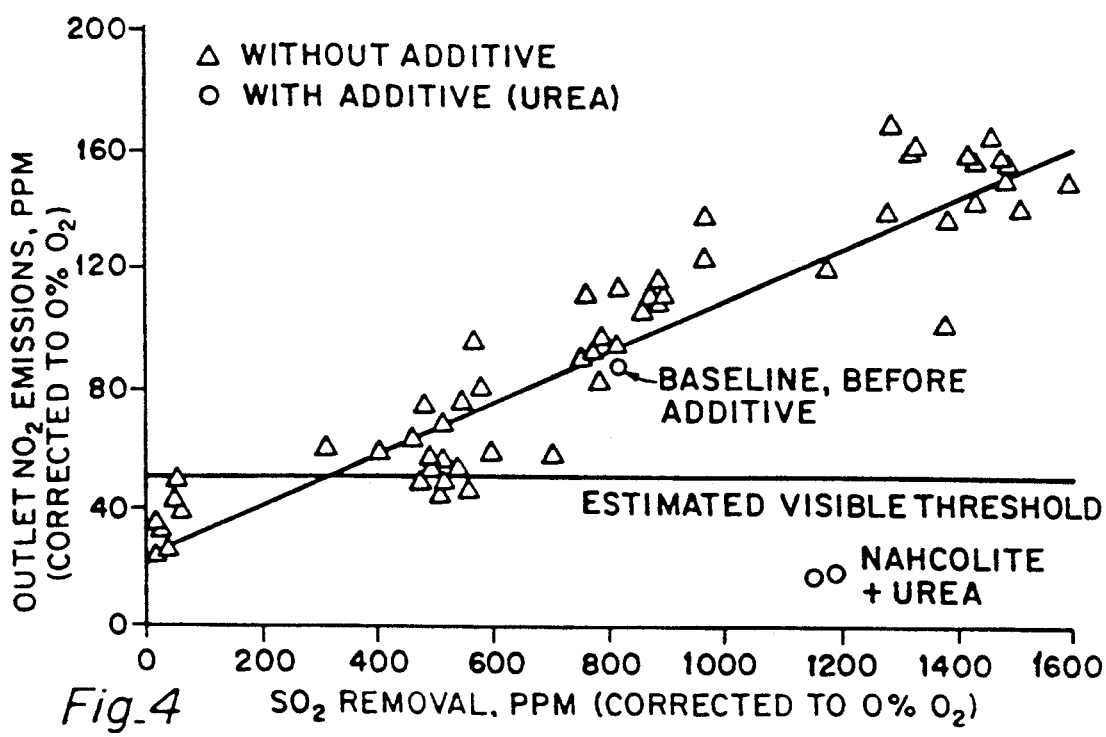

FIG. 4 is a graph of the $NO_2$ emissions at the ESP outlet vs. the $SO_2$ removed due to the sodium reagent injection. The circles are the results obtained with the addition of urea, the triangles are the results obtained without urea addition. In this example, urea (in combination with sodium bicarbonate) was injected at about 8% urea, i.e., about 0.085 lbs. urea/lb of bicarb. There was no plume coloration due to the presence of $NO_2$ when the sodium bicarbonate/urea composition of this invention was injected.

FIG. 5 is a graph showing the removal efficiency of $SO_2$ and $NO_x$ using urea in accordance with this invention expressed in terms of percent removal vs NSR. Included in the figure is an illustration of the results from a full scale application of the injection of the Nahcolite form of sodium bicarbonate without the addition of urea as compared to the increase in $SO_2$ and $NO_x$ removal with the use of the composition of this invention, sodium bicarbonate (Nahcolite) plus urea.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

While the terms sodium bicarbonate and Nahcolite are used interchangeably throughout in case of generic descriptive context, the terms are used specifically in the Examples, and the preferred reagent (or sorbent) is sodium bicarbonate. The term "reagent" means the sodium reagent alone, while "reagent composition" means reagent plus urea (also referred to as bicarb/urea).

Dry Injection Process Description

While I do not wish to be bound by theory, I presently believe the reaction of the oxides of sulfur ($SO_2$, $SO_3$) in the flue gas occurs with sodium carbonate ($Na_2CO_3$), the product of the thermal decomposition of Nahcolite or sodium bicarbonate ($NaHCO_3$). Therefore, when sodium bicarbonate/Nahcolite (herein bicarb) is injected, the first step necessary for $SO_2$ removal is the decomposition into sodium carbonate:

$$2NaHCO_3 \rightarrow Na_2CO_3 + H_2O + CO_2 \tag{1}$$

The rate of the decomposition of the bicarb controls the distance downstream of the injection location where the $SO_2$ reaction begins, and, generally speaking, the temperature of the particular flue gas at the injection location determines the rate of decomposition. Other factors influencing decomposition rate include coal type, fly ash composition, and $CO_2$, NO and humidity in the flue gas. Under the particular conditions of the tests reported here, injection of bicarb into flue gas at temperatures greater than 275° F. will assure that some sodium carbonate will be available for reaction within 0.4 seconds; this amounts to about 20 feet at typical gas velocity in the ductwork. The time/temperature relationship that the reagent experiences is essential to the efficiency of the $SO_2$ removal and the utilization of the reagent. Injection into higher flue gas temperatures (275°-700° F.) improves $SO_2$ removal and reagent utilization; injection into flue gas below 250° F. can significantly reduce reagent utilization and slow thermal decomposition.

Once the decomposition has proceeded sufficiently to provide sites of sodium carbonate, the $SO_2$ then rapidly reacts according to the following overall reaction:

$$Na_2CO_3 + SO_2 + \tfrac{1}{2}O_2 \rightarrow Na_2SO_4 + CO_2 \tag{2}$$

Previous efforts relating to this technology were almost entirely focused on the injection of sodium reagents upstream of a baghouse. This invention demonstrates the full-scale (over 100 MW) application of the injection of bicarb upstream of a ESP, and documents the unexpected improvement in the reduction of $SO_x$/$NO_x$ emissions by use of urea in combination with bicarb, preferably a composition of bicarb/urea.

Testwork

The reagent composition and methods of this invention were tested on a coal-fired power plant having an output in excess of 100 MW. For comparison tests, the boiler flue gases were divided into two equal streams so that simultaneous comparison of treated vs. untreated flue gases could be made. The flue gas streams were then recombined and emitted up a common stack.

In the tests of this invention, dry sodium sorbent (sodium bicarbonate as the reagent) injection was employed for $SO_2$ control. The dry sodium bicarbonate reagent was pulverized and then pneumatically conveyed to the flue gas ductwork between the air heater and particulate control device (ESP). The reagents were introduced into the ductwork through an injection system comprising simple injection nozzles (pipes) arranged in a manner to distribute the dry reagent particles evenly throughout the gas stream. The reaction products are then collected for disposal along with the fly ash.

The sodium bicarbonate reagent was pulverized to the desired particle size, and supplied into the feeder hopper. The feed screw from an "Acrison" feeder delivered the sodium bicarbonate reagent into an air lock feed system that was connected to a positive displacement blower. Reagent was conveyed pneumatically to the ductwork through 3-inch piping to 2-inch nozzles for injection into the flue gas. The injection nozzles were oriented pointing upstream to insure good mixing through gas flow turbulence.

The reagent composition injection system was capable of variable feed rate up to rates permitting injecting the reagent composition of this invention at a rate necessary to remove up to 80-100% of the $SO_2$.

Flue gas temperature and volume of gas flow were fixed by the plant operations. Flue gas temperature at the injection location ranged from 300°-325° F. The location of the reagent injection and the flue gas velocity determine the distance and time within which the reagent must decompose and react with $SO_2$ before it is removed from the gas stream and collected by the ESP It is estimated that the residence time of the reagent in the hot flue gas stream before collection by the ESP was about 1.5 seconds.

The coal used during the tests was a lignite having from about 6500-8900 BTU/lb. Coal was sampled from the burner feed pipes in order to follow the trends of fluctuations in ash, sulfur, and moisture content of the fuel. The ash content ranged from nominally 23 percent to greater than 30 percent; averaging about 27%. Particulate mass measurements indicate that about 20 percent of the total ash in the fuel was carried to the ESPs. The percent sulfur (dry basis) in the fuel varied from 1.3% to 1.5% without a particular pattern or trend throughout the test period. The as-fired fuel moisture content ranged from 1.4% to 3.0% without evidence of a trend. The spent reagent was predominantly $Na_2SO_4$, plus, in appropriate cases, some unknown urea reaction product.

Reagents

Chemical analysis of the Nahcolite reagent provided the basis to calculate the stoichiometric ratio (NSR) and percent utilization. The sodium bicarbonate was provided by Industrial Resources, Inc. of Lakewood, Colo. from its deposit of Nahcolite in the Picance Creek Basin Deposit in Northwestern Colorado. The sodium bicarbonate was in the form of a crystalline fine powder having a mean mass diameter of 18 $\mu$m, and a purity in of nearly 98% $NaHCO_3$. The urea was commercially available agricultural grade urea in coarse crystal flakes. The sodium bicarbonate may also be any other commercial grade of sodium bicarbonate, such as Church and Dwight 3DF (a fine powder).

The sodium bicarbonate was placed in a large hopper, fed by a screw feeder into a rotary air lock. The urea was placed in a small hopper, and fed at the rate of 0.085 lb. urea/lb. of the sodium bicarbonate by an Acrison screw feeder into the same rotary air lock into which the sodium bicarbonate was being fed. The two components were mixed together in the airlock, and then the resulting reagent composition (sodium sorbent, in this case sodium bicarbonate, plus urea) was fed into the feed pipe and conveyed pneumatically by fresh ambient air supplied by the air blower to the feed nozzles in the flue gas duct.

The reagent composition can be prepared, for example, by intermixing the sodium bicarbonate and urea in the appropriate proportions to produce for example, standard grades of 1%, 5%, 10%, 15% and above, or produce custom percentage mixtures, then bagged and shipped to the point of utility or industrial plant use. As an alternative to intermixing the crystalline urea with the sodium bicarbonate, a water solution of the urea can be sprayed onto the crystalline sodium bicarbonate on a conveyor belt, dried, and stored in a bin at the use site, or may be dried and bagged at the sodium bicarbonate production facility for shipment to the users. Still other modes of mixing the composition components and their simultaneous or sequential injection to the flue gas is within the scope of this invention.

Particle size analysis of the sodium bicarbonate was performed on a selected sample collected during the demonstration. The sample was diluted in an organic liquid and particle size distribution was measured between 3 $\mu$m and 175 $\mu$m (micro meter). The mass median diameter (MMD) of the reagent agglomerates (as received) was ~18 $\mu$m. A sample was then ultrasonically dispersed and the single particle mass median diameter (MMD) was ~7 $\mu$m.

Feed rate of the reagent was controlled both automatically and manually by the controls of the loss-in-weight (Acrison) feeders. Blowers provided a constant supply of ambient air that conveyed the reagent to the ductwork. $SO_2$ removal as a function of the amount of reagent or reagent composition injected (presented as Normalized Stoichiometric Ratio, NSR) is a measure of the effectiveness of the reagent and its distribution in the gas stream. The amount of sodium bicarbonate injected was controlled to produce several levels of $SO_2$ removal that provide the basis to evaluate this specific installation. Typical injection rate was 0.085 lbs. urea/lb sodium bicarbonate (in the 5-10% range), with the reagent composition mixture being fed at the rate of 2800-2900 lb/hr. Emissions were monitored at the air heater inlet and the ESP outlet to assess the impact of the injection of the dry sodium bicarbonate on the collection efficiency of the ESP.

Gas Measurements

Sulfur dioxide ($SO_2$), nitrogen oxide (NO), total oxides of nitrogen ($NO_x$), Oxygen ($O_2$), carbon dioxide ($CO_2$), and nitrogen dioxide ($NO_2$) were continuously sampled, monitored and recorded on analog strip charts. Calibration was conducted several times daily with standard bottled calibration gases. $SO_2$, NO or $NO_x$, and $O_2$ were measured for selected periods at one location and then switched to the other location for selected periods.

The continuous monitoring system used the analytical instruments as described below:

| Flue Gas Component | Measurement Method |
| --- | --- |
| Sulfur Dioxide | Ultraviolet, photometric |
| Nitrogen Dioxide | |
| Nitrogen Oxides | Chemiluminescence |
| Oxygen | Electrochemical |
| Carbon Dioxide | NDIR, photometric |

Particulate Measurements

Mass and particle size measurements were taken throughout the project to establish emission characteristics entering and exiting the ESP handling flue gases during treatment. Mass measurements were also taken at the inlet and outlet of the ESP during non-treatment for comparison.

Sampling methods for velocity, moisture and particle mass concentration followed federal procedures of Methods 1,2,3,4, and 17. Particle size distributions were obtained using standard Anderson cascade impactors.

Gaseous Emissions

Using the monitors described above, samples of flue gas were withdrawn through heated sample lines and analyzed for concentrations of $SO_2$, NO, $NO_x$, $NO_2$, $CO_2$, and $O_2$. A manifold of three stainless steel, sintered filters was located across the ductwork at both the air heater inlet and ESP outlet. The three sample locations in each of the ducts provided some averaging of possible stratification of gas constituents. A comparison of the concentrations of $SO_2$ and NO from each of the three locations in the inlet and outlet ducts indicated no stratification from the boiler. Further, the manifolded sample provided much the same results as a single sample taken only from the middle of the ductwork. This was true for both the inlet and outlet locations.

EXAMPLES 1-4

Utilization of Sodium Bicarbonate Alone for $SO_2$ Removal

The injection of sodium bicarbonate to remove $SO_2$ in flue gas from fossil fuel fired boilers is a well documented technology. However, this test example is unique because the injection of the Nahcolite reagent is upstream of an ESP, not a fabric filter. In the prior art it was perceived that the time necessary for the decomposition of the reagent and subsequent reaction with $SO_2$ was too great for significant $SO_2$ removal to occur in the ductwork preceding a particulate control device. Therefore, it was perceived that the $SO_2$ primarily reacted with the decomposed reagent as it passed through the cake on the fabric filter surface. Measurement of $SO_2$ removal prior to the particulate control device often substantiated this belief. This, then, curtailed any effort to employ dry sorbent injection technology with an ESP.

Recently, pilot plant efforts to combine dry injection of sodium reagent with an ESP met with some but erratic and inconclusive results in terms of $SO_2$ removal and reagent utilization. In contrast, the examples of this invention expand these efforts to a full scale demonstration, and broaden the horizon for the technology by evidence of the combination of $SO_2$ and $NO_x$ control that is achieved without production of brown plume.

FIG. 1 shows the results in graph form of four tests (Examples 1-4) of Nahcolite injected upstream of an ESP in terms of $SO_2$ Removal vs. Normalized Stoichiometric Ratio (NSR). The NSR is a measure of the amount of reagent injected relative to the amount theoretically required. For example, an NSR of 1.0 would mean that enough material was injected to theoretically yield 100 percent removal of the $SO_2$ in the inlet flue gas; an NSR of 0.5 would theoretically yield 50 percent $SO_2$ removal. The solid straight line indicates the theoretical use of the sodium bicarbonate. The curved line drawn through the data points indicates the actual $SO_2$ removal obtained in Examples 1-4, each example being one of the four data points in each curve.

These results are the first of their kind for a power plant ESP at full scale (over 100 MW), and are extremely encouraging for the future of this process and sodium bicarbonate reagent. At the lower injection rates, the $SO_2$ removal is near the theoretical limit. However, this falls off dramatically as more reagent is injected.

Percent utilization is a measure of the effective use of the reagent and is determined by dividing the percent SO$_2$ removal by the NSR. The percent utilization curve obtained in Examples 1–4 is shown in FIG. 2. The low utilization of reagent at the higher NSR values is believed to result from a somewhat uneven distribution of the reagent in the gas stream. This can be visualized as putting too much reagent in part of the gas stream (removing all the SO$_2$ in that space) and too little in the remaining space. There is too little time (too short ductwork) for the reagent to distribute evenly throughout the gas stream and react before it is collected by the ESP. Although utilization is expected to decrease with increasing NSR in all practical applications, the utilization as illustrated in FIG. 2 could be improved with a redesign of the injection nozzles.

EXAMPLES 5–44

Removal of the Oxides of Nitrogen (NO and NO$_2$); Plume Formation

Figure 3:
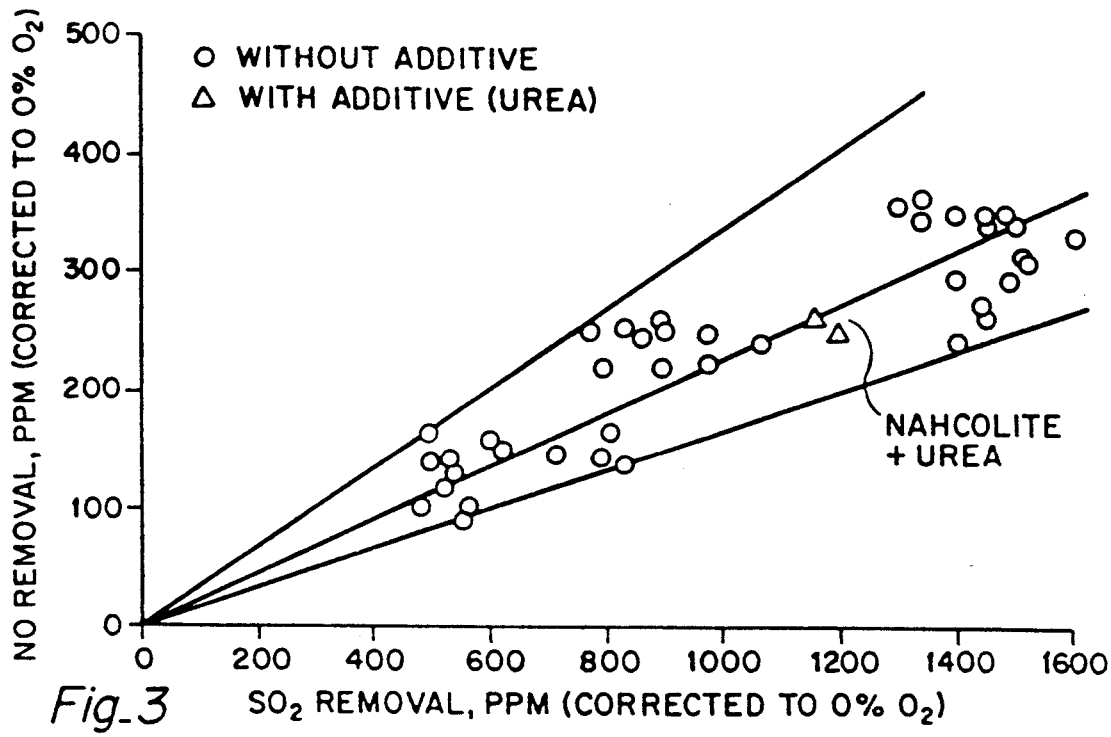
FIG. 3 is a graph of NO removal vs. $SO_2$ removal showing the range (cone) of linear relationships within which NO removal increases as $SO_2$ removal increases by use of sodium bicarbonate as a dry reagent injected ahead of an ESP.

I have discovered that nitrogen oxide (NO) was also removed upon injection of sodium bicarbonate. While simultaneous removal of small percentage of NO has been occasionally observed (to a limited degree) by several investigators of this technology, the data from the tests here demonstrate a correlation that leads me to conclude that NO removal is a direct function of SO$_2$ removal. Examples 5–44, shown graphically as the triangular data points in FIG. 3, illustrate this correlation. Although some data scatter is evident, it is clear that the change in NO concentration is directly a function of the amount of SO$_2$ removed. In FIG. 4 "Without Additive" means Nahcolite alone, while "With Additives" means urea plus Nahcolite injected as a composition mixture.

I also observed that the effect of NO removal with SO$_2$ removal is associated with a coloration of the plume emitting from the stack. This plume coloration is often described as a "brown plume"; NO$_2$ is a reddish-brown gas easily visible to the human eye. Most gases emitting from the stack are not visible to the human eye.

The NO$_2$ concentrations in the flue gas without the injection of reagent were measured to be about 20 ppm at stack conditions. As the reagent injection resulted in SO$_2$ removal, NO$_2$ concentrations at the ESP outlet increased as shown in the test results plotted in FIG. 4. All concentrations on this graph are corrected to zero percent (0%) O$_2$ levels, putting them on an equal basis. The horizontal line estimates the minimum NO$_2$ concentration visible to the human eye at about 45–50 ppm (corrected to 0% O$_2$).

Usually flue gases from utility plants average 20–25 ppm NO$_2$ and 400–800 ppm NO. FIG. 4 shows the increase in NO$_2$ in the outlet (conversion of NO to NO$_2$) during the SO$_x$ removal with Nahcolite via the sulfation reaction (2) above. Thus, for example, at 1000 ppm SO$_2$ removed by Nahcolite, approximately 225 ppm NO (see FIG. 3), is converted to NO$_2$. That plus the baseline value of 25 ppm totals 250 ppm NO$_2$ in the flue gas. FIG. 4 shows the outlet NO$_2$ is about 110 ppm. Thus a net 140 ppm NO$_2$ reacts with the sodium reagent (or possibly some other reaction product).

The level of NO$_2$ visible to the human eye is dependent upon several site specific parameters. These parameters include stack dimensions, meteorology factors, position of the viewer, and possibly the particulate concentration and size distribution exiting the stack. Plume coloration is not the same as stack opacity as measured by plant monitors. The relationship between visible NO$_2$ concentrations in the flue gas and stack opacity measured by conventional methods has not been established.

As shown in FIG. 4, without injection of reagent (i.e. zero percent SO$_2$ removal at the left end of the graph), outlet NO$_2$ concentration is just under the minimum necessary to cause plume coloration. However, with reagent injection and subsequent SO$_2$ removal of above about 300 ppm SO$_2$, NO$_2$ concentration rises significantly and causes plume coloration.

EXAMPLES 45–46

Effect of Urea Plus Sodium Bicarbonate

Results from testing a mixture of urea and sodium bicarbonate as the reagent are illustrated in FIG. 4 in the darkened circles lying just above 1200 ppm SO$_2$ and the open baseline circle. Two effects should be noted: (1), the NO$_2$ concentration at the ESP outlet was considerably below the visible threshold; and (2), SO$_2$ removal increased with the additive. This is shown by comparing the position of the open circle referred to by the legend "Baseline Before Additive" (a prior example), to the position of the two darkened circles (Examples 45 and 46). When using 0.085 lb. urea/lb. sodium bicarbonate, for example, the same 0.5 SR increased removal 50% (from 800 to 1200 ppm SO$_2$), while the NO$_2$ dropped from 90 ppm to 20 ppm. The most unexpected result is that not only was no plume coloration visible, but the SO$_2$ removed efficiency/utilization improved significantly.

The result of including the urea additive with the Nahcolite is shown in FIG. 5. Again, the straight line is the theoretical maximum SO$_2$ removal and the curved lines are the results obtained without the urea additive to the sodium sorbent. The labeled triangle is the SO$_2$ removal obtained while injecting the reagent composition of this invention, and the labeled circle is the NO$_x$ removal. These examples show unexpectedly improved SO$_2$ removal with simultaneous NO$_x$ removal, and without the undesirable "brown plume".

Particulate Emissions

Once the dry reagent has been injected into the flue gas it must be captured by the particulate emission control device. This aspect of the technology is certainly no less important that its FGD capability because particulate emission regulations also must be obeyed. Injecting more material (reagent and/or reagent composition) into the ESP would be expected to result in some loss of efficiency or increase in total particulates emitted.

The Percent Efficiency of the ESP can be calculated from mass measurements using EPA Method 17. The amount of fly ash measured at the air heater inlet ranged from 1624 pounds/hr to 8310 pounds/hr. (average =3634 pounds/hr.) Outlet mass emissions from the ESP immediately increased following the initial reagent/reagent composition injection period but did not increase with greater reagent injection rates throughout the test period. During periods of reagent injection, the ESP emissions were 64–100 percent greater than emissions from the North ESP. The reagent injection rates during these periods were 1450–6500 pounds/hr; this is 50–100 percent of the amount of fly ash at the injection location. Outlet particulate size distributions with and without injection are not significantly different. Particles slightly less than 1 μm (Log Dp=0) in diameter were some of the least efficiently collected. This is very typical of ESP performance. Particles in the size range of ~7 μm were also less efficiently collected. This effect is likely a result of the large increase of particles at the ESP inlet due to reagent injection (MMD~7 μm). However, opacity excursions above permitted limits were not exceeded, indicating the process of this invention does not pose problems with regard to particulates.

During periods of reagent injection (without urea additive) when $SO_2$ removal was greater than 25 percent, $NO_2$ concentrations developed in the flue gas caused a visible plume coloration. The group of test examples using the reagent composition of this invention (the same Na bicarbonate reagent with urea additive), resulted in simultaneous removal of $SO_2$ and $NO_x$ from the flue gas without the visual plume coloration. The continuous monitoring instruments substantiated that $NO_2$ concentration in the outlet flue gas was below visual levels.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. An $SO_x/NO_x$ pollution control reagent composition consisting essentially of from 0.1 to 25% urea in admixture with a sodium-based sorbent.

2. An $SO_x/NO_x$ pollution control reagent composition as in claim 1 wherein said sodium-based sorbent is selected from the group consisting of sodium bicarbonate, Nahcolite, soda ash, trona, sodium sesquicarbonate, and combinations thereof.

3. An $SO_x/NO_x$ pollution control reagent composition as in claim 2 wherein said reagent is sodium bicarbonate.

4. An $SO_x/NO_x$ pollution control reagent composition as in claim 2 wherein said reagent is Nahcolite.

5. An $SO_x/NO_x$ pollution control reagent composition as in claim 2 wherein said composition is in a finely divided state, and said urea is in a dry, crystalline form dispersed substantially uniformly throughout said composition.

6. An $SO_x/NO_x$ pollution control reagent composition as in claim 2, wherein said urea is in the form of a solution which is applied to said sodium sorbent to form said admixture, and thereafter said admixture is dried to form said reagent composition.

7. An $SO_x/NO_x$ pollution control reagent composition as in claim 5 wherein said reagent is sodium bicarbonate.

8. An $SO_x/NO_x$ pollution control reagent composition as in claim 5 wherein said reagent is Nahcolite.

9. An $SO_x/NO_x$ pollution control reagent composition as in claim 6 wherein said reagent is selected from the group consisting of Nahcolite and sodium bicarbonate.

10. An $SO_x/NO_x$ pollution control reagent composition as in claim 2 wherein said urea is in the form of a solution which is applied to said sorbent in an amount sufficient to form said admixture reagent composition in damp form.

11. An $SO_x/NO_x$ pollution control reagent composition as in claim 10 wherein said reagent is selected from the group consisting of Nahcolite and sodium bicarbonate.

12. An $SO_x/NO_x$ pollution control reagent composition as in claim 2 wherein said support composition is in the form of a slurry in water.

13. An $SO_x/NO_x$ pollution control reagent composition as in claim 12 wherein said reagent is selected from the group consisting of Nahcolite and sodium bicarbonate.

14. An $SO_x/NO_x$ pollution control reagent composition as in claim 2 wherein said reagent composition is in form of a solution in water.

15. An $SO_x/NO_x$ pollution control reagent composition as in claim 14 wherein said reagent is selected from the group consisting of Nahcolite and sodium bicarbonate.

* * * * *